United States Patent [19]

Watts et al.

[11] Patent Number: 5,811,377
[45] Date of Patent: *Sep. 22, 1998

[54] LOW MOLECULAR WEIGHT BASIC NITROGEN-CONTAINING REACTION PRODUCTS AS ENHANCED PHOSPHORUS/BORON CARRIERS IN LUBRICATION OILS

[75] Inventors: Raymond Frederick Watts, Long Valley, N.J.; Michael Gerald Romanelli, Brooklyn, N.Y.; Ricardo Alfredo Bloch, Scotch Plains, N.J.; Maryann Devine, Lincroft, N.J.; Jack Ryer, East Brunswick, N.J.

[73] Assignee: Exxon Chemical Patents Inc, Linden, N.J.

[*] Notice: This patent issued on a continued prosecution application filed under 37 CFR 1.53(d), and is subject to the twenty year patent term provisions of 35 U.S.C. 154(a)(2).

[21] Appl. No.: 794,136

[22] Filed: Feb. 3, 1997

Related U.S. Application Data

[63] Continuation of Ser. No. 540,639, Oct. 11, 1995, abandoned, which is a continuation of Ser. No. 101,527, Aug. 3, 1993, abandoned.

[51] Int. Cl.⁶ .................................................. C10M 141/00
[52] U.S. Cl. ............................................ 508/188; 508/228
[58] Field of Search .................................... 508/188, 161, 508/228

[56] References Cited

U.S. PATENT DOCUMENTS

| | | |
|---|---|---|
| 3,172,892 | 3/1965 | Le Suer et al. . |
| 3,219,666 | 11/1965 | Norman . |
| 3,284,409 | 11/1966 | Dorer . |
| 3,284,410 | 11/1966 | Meinhardt . |
| 3,361,673 | 1/1968 | Stuart et al. . |
| 3,502,677 | 3/1970 | Le Suer . |
| 3,511,780 | 5/1970 | Neblett . |
| 3,513,093 | 5/1970 | Le Suer . |
| 3,912,643 | 10/1975 | Adams . |
| 3,950,341 | 4/1976 | Okamoto et al. . |
| 3,991,056 | 11/1976 | Okamoto et al. . |
| 4,119,552 | 10/1978 | Davis et al. . |
| 4,615,826 | 10/1986 | Erdman . |
| 4,618,436 | 10/1986 | Horodysky . |
| 4,618,437 | 10/1986 | Horodysky . |
| 4,713,190 | 12/1987 | Erdman . |
| 4,747,971 | 5/1988 | Erdman . |
| 4,857,214 | 8/1989 | Papay et al. . |
| 4,873,004 | 10/1989 | Beverwijk et al. . |
| 5,171,466 | 12/1992 | Korosec . |
| 5,505,868 | 4/1996 | Ryan et al. ............................. 508/188 |

FOREIGN PATENT DOCUMENTS

| | | |
|---|---|---|
| 0042270 | 12/1981 | European Pat. Off. . |
| 0 454 380 A1 | 10/1991 | European Pat. Off. . |
| 0 490 454 A1 | 6/1992 | European Pat. Off. . |
| 0493928 | 7/1992 | European Pat. Off. . |
| 0493928A1 | 7/1992 | European Pat. Off. . |
| 0423892 | 1/1992 | Japan . |
| 4-23892 | 1/1992 | Japan . |
| 2078757 | 1/1982 | United Kingdom . |
| 2 257 158 | 1/1993 | United Kingdom . |
| WO85/03709 | 8/1985 | WIPO . |

*Primary Examiner*—Jacqueline V. Howard
*Assistant Examiner*—Cephia D. Toomer

[57] ABSTRACT

An oil-soluble reaction product of phosphorus-, low molecular weight basic nitrogen-, and optional boron-containing compounds is provided. This reaction product can solubilize significantly more phosphorus and boron per weight of compound than other known compounds and is used as an antiwear, antioxidant, and extreme pressure additive in lubrication oils.

11 Claims, No Drawings

LOW MOLECULAR WEIGHT BASIC NITROGEN-CONTAINING REACTION PRODUCTS AS ENHANCED PHOSPHORUS/BORON CARRIERS IN LUBRICATION OILS

This is a continuation of application Ser. No. 08/540,639 filed on Oct. 11, 1995, which is a continuation of application Ser. No. 08/101,527, filed Aug. 3, 1993, all now abandoned.

BACKGROUND OF INVENTION

1. Field of the Invention

This invention pertains generally to lubrication oil additives and particularly to multifunctional additives that are reaction products of a phosphorus-containing compound, a low molecular weight basic nitrogen-containing compound, and an optional boron-containing compound.

2. Description of Related Art

Phosphorus- and boron-containing compounds are desirable lubrication oil additives because of their known ability to improve properties of lubrication oil formulations. Phosphorus-containing compounds are known to reduce wear, lessen oxidation, and function as extreme pressure ("EP") additives. Boron-containing compounds function to inhibit oxidation and improve antiwear performance.

A limitation on the use of phosphorus- and boron-containing compounds is their somewhat limited degree of solubility in lubrication oils. Thus, because of the desirable properties that these compounds impart to lubrication oils, there is a continuing search for new phosphorus- and boron-containing compounds and methods of increasing the solubility of phosphorus and boron in lubrication oils.

One response to this search is described in U.S. Pat. No. 4,857,214, the disclosure of which is incorporated herein by reference. This patent teaches compositions and methods for preparing oil-soluble reaction products of inorganic phosphorus-containing acids or anhydrides with a boron compound and an ashless dispersant such as an alkenyl succinimide. These reaction products are useful as antiwear and EP additives in lubricating oils.

Another response is found in the additives of this invention, as described hereinafter.

SUMMARY OF THE INVENTION

This invention relates to an oil-soluble reaction product comprising:

(a) a phosphorus-containing compound;

(b) a low molecular weight basic nitrogen-containing compound which optionally contains one or more free hydroxyl groups; and (c) an optional boron-containing compound.

Other embodiments of this invention include providing concentrates and lubricating oil compositions incorporating this invention's reaction product.

A further embodiment of this invention is related to a method of improving one or more of the properties of antiwear, antioxidancy, and extreme pressure enhancement in a lubricating oil.

Another embodiment of this invention is related to a method for enhancing the solubility of phosphorus and boron in lubrication oils, thereby solubilizing significantly more phosphorus and boron per weight of additive as compared with other compounds.

DETAILED DESCRIPTION OF THE INVENTION

The phosphorus-containing compounds contemplated for use with this invention include inorganic phosphorus-containing compounds and their total or partial sulfur analogs.

The inorganic phosphorus-containing compounds include phosphorus acids and anhydrides. Examples of these compounds include phosphorous acid, phosphoric acid, hypophosphoric acid, phosphorus trichloride, phosphorus trioxide, phosphorus tetraoxide, and phosphoric anhydride. Partial or total sulfur analogs such as phosphoromonothioic acid, phosphorodithioic acid, phosphorotrithioic acid, phosphorotetrathioic acid, and phosphorus pentasulfide can also be used. Phosphorous acid is the preferred phosphorus-containing compound.

The low molecular weight basic nitrogen-containing compounds may contain one or more free hydroxyl groups and include reaction products of (i) hydrocarbyl-substituted succinic acids and succinic anhydrides with polyamines, (ii) long-chain carboxylic acids with polyamines, and (iii) hydrocarbyl-substituted phenols with aldehydes and polyamines, and mixtures thereof.

The first type of basic nitrogen-containing compound contemplated for use with this invention includes reaction products of hydrocarbyl-substituted succinic acids and succinic anhydrides with polyamines. The molecular weights (based on number average) of the hydrocarbyl-substituted groups typically range from 200 to 700, preferably from 300 to 500, most preferably from 400 to 500. Generally, at molecular weights lower than 200, the resulting reaction product tends to be insoluble in oils of lubricating viscosity. Additionally, at molecular weights above 700, the resulting reaction product tends to carry very low percentages of phosphorus and boron into the lubricant. At molecular weights over 700, the nitrogen-containing carriers can function as a dispersant; i.e., molecular weights above 700 correspond to larger hydrocarbyl-substituted groups which are capable of maintaining oil insolubles in suspension in the fluid. This is not desirable when trying to maximize the amount of phosporus and boron in the lubricant.

Suitable hydrocarbyl groups include alkyl, alkenyl, aryl, cycloalkyl, and hetero-containing analogs thereof. The hetero-containing hydrocarbyl groups may contain one or more hetero atoms. A variety of hetero atoms can be used and are readily apparent to those skilled in the art. Suitable hetero atoms include, but are not limited to, nitrogen, oxygen, phosphorus, and sulfur. A preferred hetero atom is sulfur.

The preferred hydrocarbyl-substituted group is alkenyl, preferably derived from a polyolefin. The polyolefin may be derived from a homopolymer or copolymer of one or more olefin monomers having 2 to 16 carbon atoms, preferably from 2 to 6 carbon atoms. The copolymers include random, block and tapered copolymers. Suitable monomers include ethylene, propylene, 1-butene, isobutylene, 1-pentene, and 1-octene and also diolefins such as butadiene and isoprene. If a diene is used as a monomer, the resulting polymer is preferably hydrogenated to saturate at least 75%, more preferably substantially all unsaturated bonds. It is especially preferred to use an alkenyl substituent derived from polyisobutylene.

The hydrocarbyl-substituted succinic acids and succinic anhydrides contain an average number of succinic groups per hydrocarbyl group from 1 and 5, preferably from 1 and 3, and most preferably 1.

The preparation of hydrocarbyl-substituted succinic acids and succinic anhydrides is well known in the art. For example, when the hydrocarbyl group is derived from an olefinic polymer, the olefinic polymer and maleic acid or maleic anhydride may be simply heated together as disclosed in U.S. Pat. Nos. 3,361,673 and 3,401,118 to cause a thermal "ene" reaction to take place. Or the olefinic polymer can first be halogenated, for example, chlorinated or brominated to about 1 to 8 wt. %, preferably 3 to 7 wt. % chlorine or bromine, based on the weight of polymer, by passing the chlorine or bromine through the polyolefin at a temperature of 600° to 250° C., e.g., 120° to 160° C., for about 0.5 to 10 hours, preferably 1 to 7. The halogenated polymer may then be reacted with sufficient maleic acid or maleic anhydride at 100° to 250° C., usually about 180° to 235° C., for about 0.5 to 10 hours, e.g., 3 to 8 hours, so that the product obtained will contain the desired number of moles of succinic acid or succinic anhydride per mole of the halogenated polymer. Processes of this general type are taught in U.S. Pat. Nos. 3,087,936, 3,172,892, 3,272,746 and others.

Alternatively, the olefinic polymer and the maleic acid or maleic anhydride are mixed and heated while adding chlorine to the hot material. Processes of this type are disclosed in U.S. Pat. Nos. 3,215,707, 3,231,587, 3,912,764, 4,110, 349, and in U.K. 1,440,219.

By the use of a halogen, about 65 to 95 wt. % of the polyolefin, e.g., polyisobutylene, will normally react with the maleic acid or maleic anhydride. When carrying out a thermal reaction without the use of a halogen or a catalyst, usually only about 50 to 75 wt. % of the polyisobutylene will react. Chlorination helps increase the reactivity.

The hydrocarbyl-substituted succinic acids or succinic anhydrides are reacted with a polyamine containing at least 2 total carbon atoms, typically 2 to 60, preferably 3 to 15. The polyamine contains at least 2 nitrogen atoms, typically 3 to 15, preferably 3 to 12, and most preferably 3 to 9, where at least 1 of the nitrogen atoms is a primary amine group and at least 1, preferably at least 2, of the remaining nitrogen atoms is a primary or secondary amine group.

The polyamines may be hydrocarbyl amines or may be hydrocarbyl amines including other groups, e.g., hydroxy groups, alkoxy groups, amide groups, nitriles, imidazoline groups, and the like. Hydroxyl amines with 1 to 6 hydroxy groups, preferably 1 to 3 hydroxy groups, are particularly useful. Preferred amines are aliphatic saturated amines, including those of the general formulae:

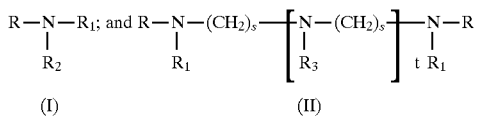

wherein R, $R_1$, $R_2$, and $R_3$ are independently selected from: hydrogen; $C_1$ to $C_{25}$ straight or branched chain alkyl radicals; alkoxy substituted alkylene radicals containing a total of 2 to 26 carbon atoms; hydroxyalkylamino substituted alkylene radicals containing a total of 2 to 26 carbon atoms; alkylamino substituted alkylene radicals containing a total of 2 to 26 carbon atoms.

$R_3$ can additionally comprise a moiety of the formula:

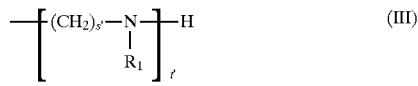

wherein: $R_1$ is as previously defined; s and s' can be the same or a different number from 2 to 6, preferably 2 to 4; and t and t' can be the same or different and are integers of from 0 to 10, preferably 2 to 7, most preferably about 3 to 7. These variables are subject to the provisos that: t is at least 1; the sum of t and t' is not greater than about 15; the nitrogen atoms in the compound total at least 2, preferably at least 3, e.g., about 3 to 15 and at least one of the nitrogen atoms is present in the form of a primary amine group and at least one, preferably at least two of the remaining nitrogen atoms are present as primary or secondary amine groups. The most preferred amine compounds of the above formulae are represented by formula II and contain at least two primary amine groups and at least one, preferably at least three, secondary amine groups.

Examples of the preferred type of polyamine include: polyethylene amines such as diethylene triamine, triethylene tetramine, and tetraethylene pentamine and polypropylene amines such as di-(1,2-propylene)triamine, di-(1,3-propylene)triamine, and mixtures thereof.

The polyamines readily react with the hydrocarbyl-substituted succinic acids and succinic anhydrides. The reaction can typically be accomplished by heating an oil solution containing 5 to 95 wt. % of a hydrocarbyl-substituted succinic acid or succinic anhydride to about 100° to 250° C., preferably 125° to 175° C., for generally 1 to 10 hours, typically from 2 to 6, until the desired amount of water is removed. The preferred products of these reactions are characterized by structures A and B, and mixtures thereof, where A and B are:

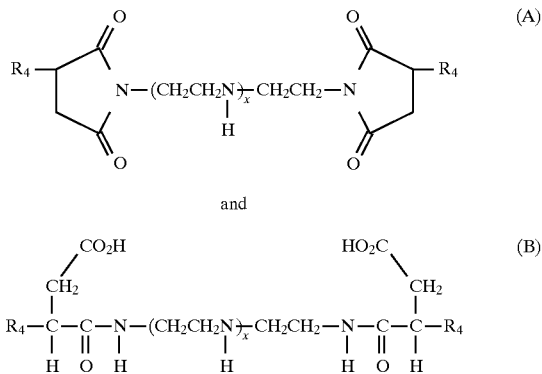

where $R_4$ represents a polyisobutylene moiety of approximately 450 molecular weight and x is an integer from 2 to 6.

The second type of low molecular weight basic nitrogen-containing compound contemplated for use with this invention includes the reaction product of long-chain carboxylic acids with polyamines.

Suitable carboxylic acid reactants include low molecular homopolymers or copolymers of $C_2$ to $C_{12}$ olefins terminated with a carboxyl group. For example, the carboxylic acid could be formed by reacting a particular olefinic homopolymer or copolymer with acrylic acid.

The preferred carboxylic acid reactant is an aliphatic mono acid (fatty acid) characterized by the formula:

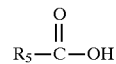

where $R_5$ is a straight or branched chain, saturated or unsaturated, aliphatic hydrocarbyl radical containing from 9 to 29 carbon atoms, preferably from 11 to 23 carbon atoms. $R_5$ is preferably straight; however, limited branching or short side chains such as those introduced by using a material like polybutene are acceptable. Accordingly, the number average molecular weight of the $R_5$ group typically ranges from 150 to 500, preferably from 200 to 300, and most preferably from 200 to 250. As with the hydrocarbyl-substituted groups on the succinamides and succinimides, at molecular weights typically below 150, the resulting reaction product tends to be insoluble in oils of lubricating viscosity. Generally, at molecular weights above 400, the reaction product can have undesirable effects on fluid viscosity at low temperatures (i.e., Brookfield viscosity at −40° C.).

The fatty acid may be derived from natural sources or may be synthetically manufactured. The term "hydrocarbyl", when used to describe the fatty acid hydrocarbyl groups, include predominantly hydrocarbyl groups as well as purely hydrocarbyl groups. The description of these groups as predominantly hydrocarbyl means that they contain no non-hydrocarbyl substituents or non-carbon atoms significantly affecting the hydrocarbyl characteristics or properties of such groups relevant to their uses as described herein. For example, a purely hydrocarbyl $C_{20}$ alkyl group and a $C_{20}$ alkyl group substituted with a methoxy substituent are substantially similar in their properties and are considered hydrocarbyl within the context of this disclosure. Sulfurized versions of the fatty acids may also be used.

Non-limiting examples of substituents that do not significantly alter the hydrocarbyl characteristics or properties of the general nature of the hydrocarbyl groups of the fatty acid are the following:

Ether groups (especially hydrocarbyloxy such as phenoxy, benzyloxy, methoxy, n-isotoxy, etc., particularly alkoxy groups of up to ten carbon atoms);

Oxo groups (e.g. -O- linkages in the main carbon chain);

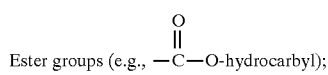

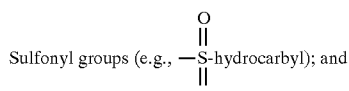

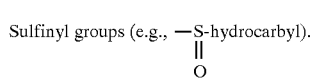

These fatty acids are reacted with polyamines of the type already discussed at temperatures from about 120° to 250° C. in proportions of about 0.1 to 10 molar equivalents of fatty acid per mole of amine reactant for about 1 to 12 hours. The molar ratio of fatty acid to polyamine is preferably from about 2.5 to 7, most preferably from about 3 to 5 molar equivalents. The preferred polyamines are the polyethylene amines described above.

The preferred carboxylic acid-polyamine reaction product may be characterized by structure C:

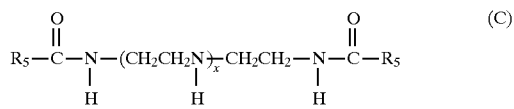

where $R_5$ represents an alkyl chain of about 16 carbon atoms and x is an integer from 2 to 6.

The third type of low molecular weight basic nitrogen-containing compound contemplated for use with this invention includes reaction products of hydrocarbyl-substituted phenols with aldehydes and polyamines. Suitable hydrocarbyl substitution groups are the same as described above for use with the succinamides and succinimides. The preferred hydrocarbyl groups are the alkenyls derived from a polyolefin with number average molecular weights ranging from 150 to 700, preferably from 300 to 500, and most preferably from 400 to 500. The preferred aldehyde is formaldehyde. The preferred polyamines are the polyethylene amines already described.

Preparation of these low molecular weight reaction products is analogous to well-known methods used to prepare higher molecular weight Mannich condensation products. Such methods are described in, for example, U.S. Pat. Nos. 3,649,229, 3,803,039, and 3,980,569, the disclosures of which are incorporated herein by reference.

The reactant mixture optionally contains a boron-containing compound. Suitable boron-containing compounds include boron acids such as boric acid; esters of such acids, such as mono-, di- and tri-organic esters with alcohols having 1 to 20 carbon atoms, e.g., methanol, ethanol, isopropanols, butanols, pentanols, hexanols, ethylene glycol, propylene glycol and the like; and boron oxides such as boron oxide and boron oxide hydrate. The preferred boron-containing compound is boric acid.

The reactant mixture may contain auxiliary molar amounts of basic nitrogen up to that equal to the molar amount of basic nitrogen provided by the low molecular weight basic nitrogen-containing compounds. Preferred auxiliary nitrogen compounds are long chain primary, secondary, and tertiary alkyl amines containing from about 12 to 24 carbon atoms, including their hydroxyalkyl derivatives. The long chain alkyl group optionally contains one or more ether groups. Examples of suitable compounds are oleyl amine, N-tallow diethanolamine, and myristyloxapropyl amine.

Other materials normally used in lubricant additives that do not interfere with the reaction may also be present in the reactant mixture. For example, a small amount of a triazole such as tolyl triazole may be added as a copper passivator. Suitable triazoles include benzotriazole and alkyl-substituted benzotriazoles preferably having 1 or 2 alkyl groups containing 1 to 10 carbon atoms, most preferably 1 carbon atom. The most preferred triazole is tolyl triazole which is available commercially under the tradename Cobratec TT-100.

The reaction can be carried out in the absence of solvent by mixing and heating the reactants at temperatures of about 40°–200° C. (preferably about 100° C.) for about 0.5 to 3 hours with agitation until a clear, oil-soluble solution is obtained. Preferably, water is added to facilitate the initial dissolution of the boron compound. Water formed in the reaction and any added water is then removed by vacuum distillation at temperatures of from about 40°–120° C. Preferably, the reaction is carried out in a diluent oil or a solvent such as a mixture of aromatic hydrocarbons. The reaction may be run with the incorporation of a conventional anti-foamant such as polydimethylsiloxane to facilitate water removal.

The amount of phosphorus compound employed ranges from about 0.1 to 3 moles per mole of basic nitrogen and free hydroxyl in the reaction mixture up to one half of which may be contributed by an auxiliary nitrogen compound. The amount of boron compound employed ranges from about 0.1 to about 3.0 moles per mole of basic nitrogen and free hydroxyl in the mixture which is in excess of the molar amount of phosphorus-containing compound.

The amount of added water is not particularly critical because it is removed by distillation at the end of the reaction. Amounts up to about 10 percent by weight of the mixture are preferred. When used, the amount of diluent generally ranges from about 5 to about 50 percent by weight of the mixture. When added, the amount of copper protectant generally ranges from about 1 to 20 percent by weight of the mixture.

The typical and preferred amounts of reactants used to produce this invention's reaction product are:

| Reactant | Broad Range (wt. %) | Preferred Range (wt. %) |
| --- | --- | --- |
| Phosphorus-Containing Compound | 1–25 | 1–10 |
| Low MW Basic N$_2$ Compound | 50–75 | 60–70 |
| Boron-Containing Compound (1) | 0–25 | 0–10 |
| Auxiliary Basic N$_2$ Compound (1) | 0–50 | 0–20 |
| Tolyl Triazole (1) | 0–15 | 0–10 |
| Water (1) | 0–10 | 0–5 |
| Diluent Oil (1) | 0–50 | 0–30 |

(1) Optional

The reaction product, including any optional compounds, may be blended with other lubrication oil additives to form a concentrate or a fully finished lubricant formulation such as a power transmitting fluid, especially an automatic transmission fluid.

Typical lubrication oil additives include dispersants, corrosion inhibitors, detergents, pour point depressants, extreme pressure additives, viscosity index improvers, friction modifiers, and the like. These additives are typically disclosed in, for example, "Lubricant Additives" by C. V. Smalheer and R. Kennedy Smith, 1967, pp. 1–11 and in U.S. Pat. No. 4,105,571, the disclosures of which are incorporated herein by reference.

A concentrate generally contains a major portion of the reaction product of this invention together with other desired additives and a minor amount of diluent oil or other solvent. The reaction product and desired additives (i.e., active ingredients) are provided in the concentrate in amounts that give a desired concentration in a finished formulation when combined with a predetermined amount of lubrication oil. The collective amounts of active ingredient in the concentrate are typically from about 10 to 90, preferably from about 25 to 75, most preferably from 40 to 60 wt. %, with the remainder being a lubrication oil basestock.

On the other hand, a fully finished lubrication oil formulation may contain about 1 to 20 wt. % active ingredient with the remainder being a lubrication oil basestock. However, the precise types and amounts of active ingredient depends on the particular application. Representative amounts of additives in lubrication oil formulations are:

| Additive | Broad Range Wt. % | Preferred Range Wt. % |
| --- | --- | --- |
| VI Improvers | 1–12 | 1–4 |
| Corrosion Inhibitor/ Passivators | 0.01–3 | 0.01–1.5 |
| Anti-Oxidants | 0.01–5 | 0.01–1.5 |
| Dispersants | 0.10–10 | 0.1–8 |
| Anti-Foaming Agents | 0.001–5 | 0.001–1.5 |
| Detergents | 0.01–6 | 0.01–3 |
| Anti-Wear Agents | 0.001–5 | 0.001–1.5 |
| Pour Point Depressants | 0.01–2 | 0.01–1.5 |
| Seal Swellants | 0.1–8 | 0.1–6 |
| Friction Modifiers | 0.01–3 | 0.01–1.5 |
| Lubricating Base Oil | Balance | Balance |

Lubrication oil basestocks contemplated for use with this invention can be derived from natural lubricating oils, synthetic lubricating oils, or mixtures thereof. In general, the lubricating oil basestock has a viscosity in the range of about 5 to about 10,000 mm$^2$/s (cSt) at 40° C., although typical applications require an oil having a viscosity ranging from about 10 to about 1,000 mm$^2$/s (cSt) at 40° C.

Natural lubricating oils include animal oils, vegetable oils (e.g., castor oil and lard oil), petroleum oils, mineral oils, and oils derived from coal or shale.

Synthetic oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-hexenes), poly(1-octenes), poly(1-decenes), etc., and mixtures thereof); alkylbenzenes (e.g., dodecylbenzenes, tetradecylbenzenes, dinonylbenzenes, di(2-ethylhexyl)benzene, etc.); polyphenyls (e.g., biphenyls, terphenyls, alkylated polyphenyls, etc.); alkylated diphenyl ethers, alkylated diphenyl sulfides, as well as their derivatives, analogs, and homologs thereof; and the like.

Synthetic lubricating oils also include alkylene oxide polymers, interpolymers, copolymers and derivatives thereof wherein the terminal hydroxyl groups have been modified by esterification, etherification, etc. This class of synthetic oils is exemplified by polyoxyalkylene polymers prepared by polymerization of ethylene oxide or propylene oxide; the alkyl and aryl ethers of these polyoxyalkylene polymers (e.g., methyl-polyisopropylene glycol ether having an average molecular weight of 1000, diphenyl ether of polyethylene glycol having a molecular weight of 500–1000, diethyl ether of polypropylene glycol having a molecular weight of 1000–1500); and mono- and polycarboxylic esters thereof (e.g., the acetic acid esters, mixed $C_3$ to $C_8$ fatty acid esters, and $C_{13}$ oxo acid diester of tetraethylene glycol).

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids, etc.) with a variety of alcohols (e.g., butyl alcohol, hexyl alcohol, dodecyl alcohol, 2-ethylhexyl alcohol, ethylene glycol, di-ethylene glycol monoether, propylene glycol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid, and the like.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol, tripentaerythritol, and the like. Synthetic hydrocarbon oils are also obtained from hydrogenated oligomers of normal olefins.

Silicone-based oils (such as the polyalkyl-, polyaryl-, polyalkoxy-, or polyaryloxy-siloxane oils and silicate oils) comprise another useful class of synthetic lubricating oils. These oils include tetraethyl silicate, tetraisopropyl silicate, tetra-(2-ethylhexyl) silicate, tetra-(4-methyl-2-ethylhexyl) silicate, tetra(p-tert-butylphenyl) silicate, hex-(4-methyl-2-pentoxy)-disiloxane, poly(methyl)-siloxanes and poly(methylphenyl) siloxanes, and the like. Other synthetic lubricating oils include liquid esters of phosphorus-containing acids (e.g., tricresyl phosphate, trioctyl phosphate, diethyl ester of decylphosphonic acid), polymeric tetrahydrofurans, polyalphaolefins, and the like.

The lubricating oil may be derived from unrefined, refined, rerefined oils, or mixtures thereof. Unrefined oils are directly obtained from a natural source or synthetic source (e.g., coal, shale, or tar sands bitumen) without further purification or treatment. Examples of unrefined oils include a shale oil directly obtained from a retorting operation, a petroleum oil directly obtained from distillation, or an ester directly obtained from an esterification process, each of which is then used without further treatment. Refined oils are similar to the unrefined oils except that refined oils have been treated in one or more purification steps to improve one or more properties. Suitable purification techniques include distillation, hydrotreating, dewaxing, solvent extraction, acid or base extraction, filtration, and percolation, all of which are known to those skilled in the art. Rerefined oils are obtained by treating refined oils in processes similar to those used to obtain the refined oils. These rerefined oils are also known as reclaimed or reprocessed oils and are often additionally processed by techniques for removal of spent additives and oil breakdown products.

This invention may be further understood from the following examples which contain preferred embodiments and are not intended to restrict the scope of the appended claims.

I. PREPARATIVE EXAMPLES

A. Low MW Basic Nitrogen-Containing Reactant Preparation (i) Polyisobutenyl succinic anhydride—Polyamine ("PIBSA-PAM")

Polyisobutenyl succinic anhydride ("PIBSA") having a succinic anhydride ("SA") to polyisobutylene ("PIB") ratio (SA:PIB), i.e., functionality, of about 1, was prepared by gradually heating a mixture of 170 kg (280 lbs.) of PIB having a number average molecular weight ($\overline{M}n$) of 450 with approximately 27.7 kg (61 lbs.) of maleic anhydride to a temperature of approximately 120° C. Chlorine gas was then bubbled through the mixture at approximately 2.7 kg (6 lbs.) per hour. The reaction mixture was then heated to approximately 160°–170° C. and was maintained at that temperature until a total of approximately 22.9 kg (50.5 lbs.) of chlorine was added. The reaction mixture was then heated to approximately 220° C. and sparged with nitrogen to remove unreacted maleic anhydride. The resulting polyisobutenyl succinic anhydride had an ASTM Saponification Number ("SAP") of 176, which calculates to a SA to PIB ratio of 1.14 based upon the starting PIB.

The PIBSA product was aminated by charging to a reactor approximately 36.3 kg (80 lbs.) of the PIBSA; approximately 6.0 kg (13.1 lbs.) of a commercial grade of polyethylene amine which was a mixture of polyethylene amines averaging about 5 to 7 nitrogen per molecule ("PAM"); 13.7 kg (30.2 lbs.) of a solvent 150 neutral oil (Exxon S150N); and 5.5 grams of a 50% mixture of a silicone-based antifoamant in a hydrocarbon solvent. The mixture was heated to 150° C., and a nitrogen sparge started to drive off water. The mixture was maintained at 150° C. for 2 hours when no further water was evolving. The product was cooled and drained from the reactor to give the final product ("PIBSA-PAM"). This product had a viscosity of 510 mm²/s (cSt) at 100° C. and a nitrogen content of 3.7 wt. % and contained approximately 88 wt. % PIBSA-PAM.

(ii) Carboxylic acid—Polyamine (1) Isostearic acid—TEPA

A reaction product of isostearic acid ("ISA") and tetraethylene pentamine (Union Carbide HP TEPA: "TEPA") was prepared by adding 450 grams of ISA to a 500 ml round bottom 4-neck flask equipped with a reflux condenser, a stirring bar, and a nitrogen bubbler in order to obtain a level sufficient to permit agitation and heat transfer. The flask contents were then heated to 110° C., and 189 grams (about 1 mole) of TEPA were added slowly while mixing. After all the TEPA was added to the flask, an additional 450 grams of ISA were added while stirring at 110° C. (a total of about 3.125 moles of ISA were added). The batch temperature was then slowly raised to drive the condensation reaction. Water of condensation began to appear immediately and was removed through the flask overhead system with a nitrogen sparge. After most of this water was removed (at approximately 160° C.), vacuum stripping was applied, and the flask temperature was raised to 200° C. to drive the condensation to completion. The reaction was complete after about 5 hours with 3 moles of ISA reacting with 1 mole of TEPA to form ISA-TEPA.

TEPA, theoretically, is a single polyamine compound having the formula $H_2N$—N—N—N—$NH_2$, where —N—N— represents $$-\underset{H}{N}-CH_2CH_2-\underset{H}{N}-$$

However, commercially available TEPA, such as Union Carbide HP TEPA, actually comprises a mixture of amines. The actual composition of the TEPA which is commercially available from Union Carbide is:

| Polyamine Structure | Union Carbide Technical Grade TEPA, wt. % | Union Carbide HP TEPA, wt. % |
|---|---|---|
| N—N—N | 13.6 | 2.0 |
|  | 2.8 | 0.6 |
|  | 9.4 | 3.5 |
| N—N—N—N<br>      \|<br>      N | 12.6 | 13.5 |
| N—N—N—N—N | 22.4 | 28.7 |
|  | 14.5 | 19.7 |
|  | 6.9 | 11.8 |
| N—N—N—N—N<br>        \|<br>        N | 2.4 | 3.4 |
| N—N—N—N—N<br>        \|<br>        N | 3.8 | 3.4 |
| N—N—N—N—N—N | 2.4 | 2.6 |
| Unidentified higher molecular weight species | 9.2 | 10.8 |

| Polyamine Structure | Union Carbide Technical Grade TEPA, wt. % | Union Carbide HP TEPA, wt. % |
|---|---|---|

(2) Oleic Acid—TEPA

A reaction product of oleic acid and TEPA was prepared by adding 450 grams of oleic acid to a 500 ml round bottomed 4-neck flask equipped with a reflux condenser, a stirring bar, and a nitrogen bubbler to obtain a level sufficient for agitation and heat transfer. The flask contents were then heated to 110° C., and 189 grams (about 1 mole) of TEPA were added slowly with mixing. After all of the TEPA was added to the flask, an additional 450 grams of oleic acid were added with stirring at 110° C. (a total of about 3.125 moles of oleic acid were added). The batch temperature was then slowly raised to drive the condensation reaction. Water of condensation began to appear immediately and was removed through the flask overhead system with a nitrogen sparge. After most of this water was removed (at approximately 160° C.), vacuum stripping was applied, and the flask temperature was raised to 200° C. to drive the condensation to completion. The reaction was complete after about 5 hours with 3 moles of oleic acid reacting with 1 mole of TEPA to form Oleic Acid-TEPA.

B. Reaction Product Preparation

Five reaction products, A–E, were prepared according to the procedures given below.

(i) Phosphorous Acid Reaction Product Procedure

Reaction components were charged into a round bottomed flask equipped with a stirrer, thermometer, $N_2$ inlet, and Dean-Stark trap with attached condenser. The top of the condenser was connected to the vacuum pump through dry ice traps. The apparatus was flushed with nitrogen and then heated with the nitrogen flow off for two hours at 100° C. The pressure was then gradually reduced to 40 mm and the temperature increased to 110° C. Water was then taken overhead in the Dean-Stark trap, and the reaction continued until a clear solution resulted. This step took about one hour.

(ii) Phosphorous/Boric Acid Reaction Product Procedure

This procedure was substantially the same as the phosphorous acid reaction procedure except that the reaction flask was first charged with the water and $H_3BO_3$, heated slightly, and then charged with the remaining reaction components.

The amounts of reaction components used and the phosphorus and boron contents of the resulting reaction products are summarized in Table 1.

TABLE 1

| Reactants* | A | B | C | D | E |
|---|---|---|---|---|---|
| Isostearic Acid-TEPA | 250.0 | 250.0 | — | — | — |
| Oleic Acid-TEPA | — | — | 250.0 | — | — |
| 450 MW PIBSA-PAM | — | — | — | 250.0 | 250.0 |
| $H_3PO_3$ | 25.0 | 11.0 | 11.0 | 25.0 | 11.0 |
| $H_3BO_3$ | — | 11.0 | 11.0 | — | 11.0 |
| Water | 9.0 | 9.0 | 9.0 | 9.0 | 9.0 |

TABLE 1-continued

| Reactants* | A | B | C | D | E |
|---|---|---|---|---|---|
| Diluent Oil | 90.0 | 90.0 | 90.0 | 90.0 | 90.0 |
| Calculated (Wt. % Theory) | | | | | |
| Nitrogen | 4.4 | 4.0 | 4.5 | 2.4 | 2.5 |
| Phosphorus | 2.6 | 1.2 | 1.2 | 2.6 | 1.2 |
| Boron | — | 0.5 | 0.5 | — | 0.5 |

*Amounts in grams

II. FLUID PERFORMANCE EXAMPLES

Five mineral oil formulations, N-R, containing varying amounts of reaction products A-E were prepared. Two comparative formulations, S and T, were used. Formulation S was a "blank" formulation containing no phosphorus source. Formulation T was a commercial ATF formulation used as the MERCON® reference fluid by Ford (Exxon FN 1975).

Formulations N–S were prepared from the same lubrication oil basestock using conventional amounts of dispersant, antioxidant, friction modifier, seal swellant, antifoamant, and viscosity modifier. The amounts of these additives remained the same for Formulations N–S so that the effect of the reaction products A–E could be quantified in each formulation.

The treat level of reaction products A–E was chosen to give 250 ppm phosphorus in the finished formulations N–R. The levels of boron and nitrogen in the formulations were allowed to vary. Table 2 summarizes the weight percent of the various reaction products contained in formulations N–R.

TABLE 2

| | Formulation | | | | | | |
|---|---|---|---|---|---|---|---|
| Additive* | N | O | P | Q | R | S | T |
| Reaction Product A | 0.97 | — | — | — | — | BLANK | COMMERCIAL |
| Reaction Product B | — | 2.17 | — | — | — | | |
| Reaction Product C | — | — | 2.17 | — | — | — | |
| Reaction Product D | — | — | — | 0.97 | — | — | |
| Reaction Product E | — | — | — | — | 2.17 | — | — |

*Weight % of Total Formulation

Formulations N–T were then tested for antiwear, extreme pressure and antioxidency performance.

Wear Testing

Formulations N–T were run in the ASTM D-2266 Four Ball Wear Test. In this test, approximately 5 ml of formulated fluid was placed on four steel balls arranged in a pyramidal configuration in a steel cup. The three lower balls were held in place while the top ball rotated against them. A load of 40 kilogram at 1200 rpm was applied at a temperature of 75° C. for 1 hour. The average wear scar diameter of the three lower balls was determined for each formulation. These results are reported below.

FOUR BALL WEAR TEST RESULTS

| F[1] | Phosphorus- and/or Boron Containing Rxn.-Prod. | % By Wt. | P %[2] | B %[2] | Scar Diameter (mm) |
|---|---|---|---|---|---|
| N | Isostearic Acid-TEPA | 0.97 | 0.025 | — | 0.36 |
| O | " | 2.17 | 0.025 | 0.01 | 0.35 |
| P | Oleic Acid-TEPA | 2.17 | 0.025 | 0.01 | 0.33 |
| Q | 450 MW PIBSA-PAM | 0.97 | 0.025 | — | 0.34 |
| R | 450 MW PIBSA-PAM | 2.17 | 0.025 | 0.01 | 0.33 |
| S | None - BLANK | — | — | — | 0.56 |
| T | None - COMMERCIAL | — | 0.017 | 0.02 | 0.39 |

[1]F = Formulation
[2]Contributed by the product of the invention N thru S;
T is total contained in product.

The results show that all formulations containing the reaction product of this invention produced wear scars significantly less than those of Formulation S, the blank, and comparable to the commercial ATF, fluid T.

Extreme Pressure Performance

Formulations N–T were run in the FZG Gear Test, according to the DIN 51354 (Germany) test procedure. Accordingly, the gear set was run using each test formulation at increasing load stages until scoring of the tooth flank occurred. Therefore, failure of a formulation at higher load stages is desirable. Results of this test are:

FZG GEAR TEST

| F[1] | Phosphorus- and/or Boron- Containing Rxn.-Prod. | % By Wt. | P %[2] | B %[2] | Stage Failure |
|---|---|---|---|---|---|
| N | Isostearic Acid-TEPA | 0.97 | 0.025 | — | 12 |
| O | " | 2.17 | 0.025 | 0.01 | 12 |
| P | Oleic Acid-TEPA | 2.17 | 0.025 | 0.01 | 12 |
| Q | 450 MW PIBSA-PAM | 0.97 | 0.025 | — | 11 |
| R | 450 MW PIBSA-PAM | 2.17 | 0.025 | 0.01 | 11 |
| S | None - BLANK | — | — | — | 8 |
| T | None - COMMERCIAL | — | 0.017 | 0.02 | 10 |

[1]F = Formulation
[2]Contributed by the product of the invention N thru S;
T is total contained in product.

The results of this test indicate that the formulations containing the reaction products of this invention gave better results than Formulation S, the nonphosphorus-containing blank, and Formulation T, the commercial ATF.

Five additional mineral oil formulations, U–Y, were prepared containing varying amounts of reaction products A, B, D, and E.

Formulations U–Y were prepared from the same lubrication oil basestock containing conventional amounts of ashless dispersant, borated ashless dispersant, antioxidant, friction modifier, seal swellant, antifoamant, and viscosity modifier.

The treat level of reaction products A, B, D, and E were chosen to give approximately 250 ppm phosphorus in Formulations U–Y. The boron concentration was adjusted to approximately 100 ppm by using either borated or unborated ashless dispersant. Table 3 summarizes the weight percent and the reaction product contained in the various formulations.

TABLE 3

| Additive* | Formulation | | | | | |
| | U | V | W | X | Y | Z |
|---|---|---|---|---|---|---|
| Reaction-Prod. A | 0.77 | — | — | — | — | C O M M E R C I A L |
| Reaction-Prod. B | — | 1.74 | — | — | — | |
| Reaction-Prod. D | — | — | 0.77 | — | 1.00 | |
| Reaction-Prod. E | — | — | — | 1.74 | — | |
| Phosphorus (ppm) 190 | 250 | 250 | 250 | 250 | 250 | |
| Boron (ppm) 190 | 105 | 90 | 105 | 90 | 105 | |

*Weight % of Total Formulation

Anti-oxidation Test

Formulations U–Y and the commercial ATF, Formulation Z, were tested according to the Ford Aluminum Beaker Oxidation Test ("ABOT"). In this test, the formulations were maintained at 155° C. for 250 hours with 5 ml/min. of air continuously introduced. At the end of the test, the formulations were tested for percent of pentane insolubles present, total acid number ("TAN") change, infrared ("IR") change, and percent viscosity increase at 40° C. These results are presented below.

FORD ALUMINUM BEAKER OXIDATION TEST

| F* | Phosphorus- and/or Boron- Containing Rxn-Prod. | Percent Pentane Insolubles | TAN Change | IR Change | Percent Viscosity Increase (@ 40° C.) |
|---|---|---|---|---|---|
| U | Isostearic Acid-TEPA | 0.23 | 3.16 | 27.45 | 13.80 |
| V | Isostearic Acid-TEPA | 0.23 | 3.38 | 33.99 | 15.78 |
| W | 450 MW PIBSA-PAM | 0.19 | 3.12 | 27.99 | 16.38 |
| X | 450 MW PIBSA-PAM | 0.21 | 2.98 | 31.87 | 12.99 |
| Y | 450 MW PIBSA-PAM | 0.18 | 3.08 | 26.33 | 11.54 |
| Z | None - Commercial | 4.3 | 5.49 | 31.15 | 63.9 |

*F = Formulation

The results of the ABOT test show that in most cases the formulations containing the reaction products of this invention performed substantially better than the commercial formulation, Z, in the categories of percent pentane insolubles, TAN change, and percent viscosity increase. The formulations containing the reaction products of this invention performed as good as the commercial formulation, Z, in the category of IR change.

What is claimed is:

1. An oil-soluble reaction product composition formed by reacting:
   (a) an inorganic phosphorus-containing compound;
   (b) a low molecular weight basic nitrogen-containing compound which optionally contains one or more free hydroxyl groups, said compound being the reaction product of hydrocarbyl-substituted succinic acids and succinic anhydrides with polyamines, and mixtures thereof, wherein the hydrocarbyl-substituted groups have a number average molecular weight of about 200 to 450; and (c) a boron-containing compound.

2. The composition of claim 1 where the amount of (a) is from 0.1 to 3.0 moles of phosphorus per mole of basic nitrogen and free hydroxyl and the amount of (c) is from 0.1 to 3.0 moles of phosphorus per mole of basic nitrogen and free hydroxyl, which is in excess of the molar amount of (a).

3. The composition of claim 2, where the phosphorus-containing compound is an inorganic phosphorus acid or anhydride.

4. The composition of claim 3 where the hydrocarbyl-substituted groups are alkyl, alkenyl, aryl, cycloalkyl, and hetero atom-containing analogs thereof.

5. The composition of claim 4 where (b) is the reaction product of polyisobutenyl succinic anhydride and polyethylene amines having an average of 3 to 8 nitrogen atoms per molecule.

6. The composition of claim 5 where the polyisobutenyl succinic anhydride has a ratio from 1 to 3 succinic anhydride groups per polyisobutylene group.

7. An oil-soluble lubricant additive concentrate comprising a major portion of the composition of claim 1 and a minor portion of a diluent oil.

8. A lubricant oil composition comprising a major amount of a lubrication oil and an amount of the composition of claim 1 effective to impart to the lubrication oil at least one of the properties of antiwear, antioxidancy, and extreme pressure enhancement.

9. A method for improving one or more of the properties of antiwear, antioxidancy, and extreme pressure enhancement of a lubrication oil by adding to the oil an effective amount of the composition of claim 1.

10. A method for solubilizing phosphorus and boron in lubrication oil by adding to the oil an effective amount of the composition of claim 1.

11. The composition of claim 6 wherein (b) of the reaction product is characterized by A, B, or mixtures thereof, and where A and B are

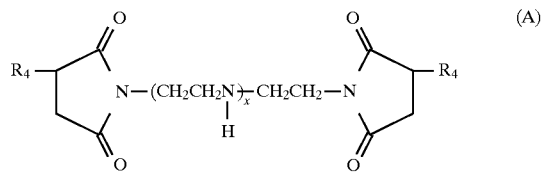

and

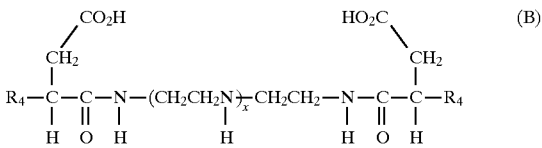

where $R_4$ represents a polyisobutylene moiety having a number average molecular weight from about 200 to 450, and x is an integer from 2 to 6.

* * * * *